Sept. 15, 1936.　　　　　O. H. BENNETT　　　　　2,054,237
AUTOMATIC PHOTOROLL PRINTER
Filed Dec. 10, 1934　　　　5 Sheets-Sheet 1

Inventor
OTTO H. BENNETT.
By Martin P. Smith
Attorney

Sept. 15, 1936.   O. H. BENNETT   2,054,237
AUTOMATIC PHOTOROLL PRINTER
Filed Dec. 10, 1934   5 Sheets-Sheet 2
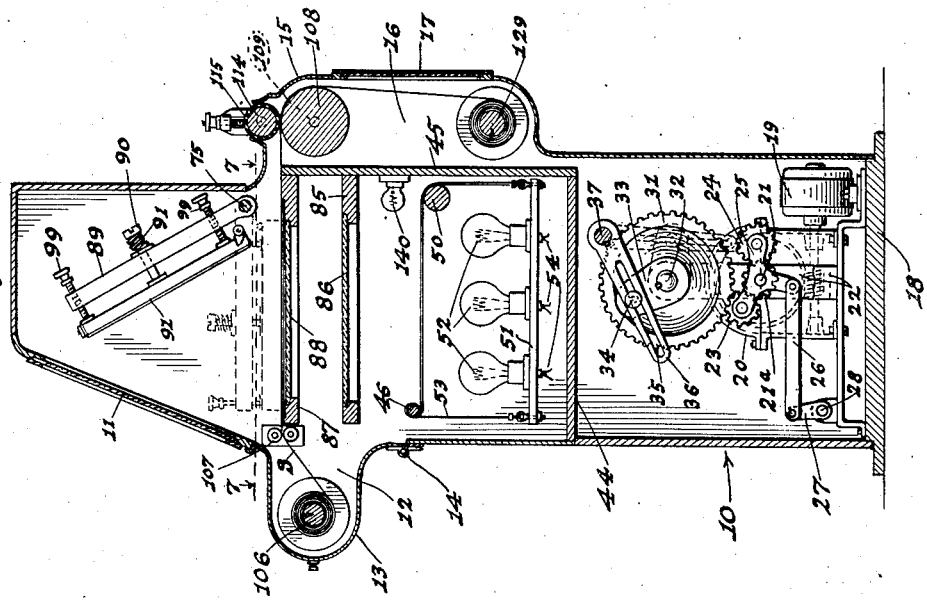
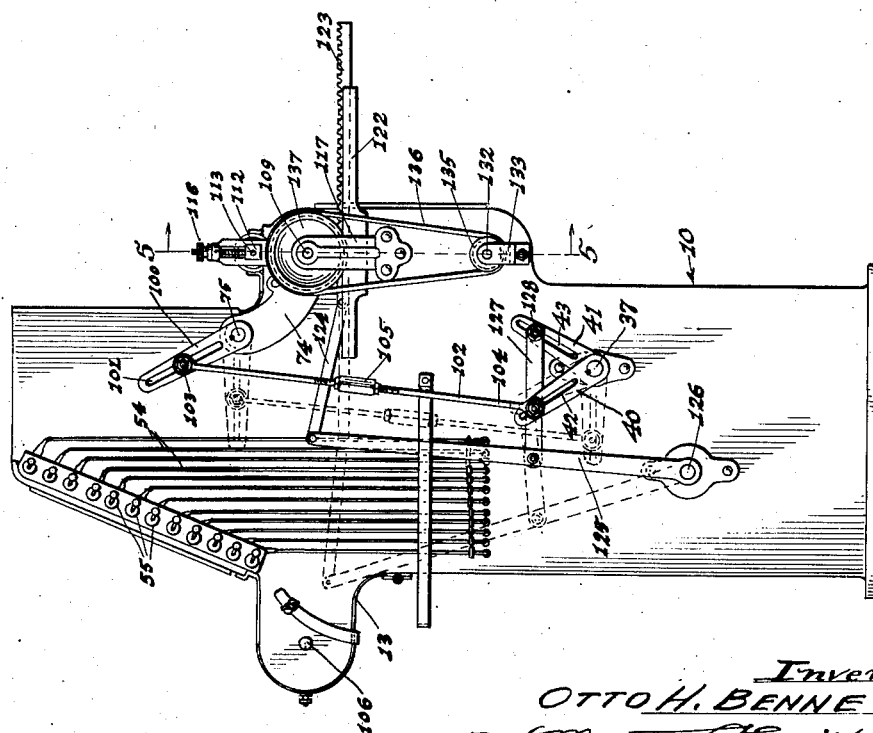
Inventor
OTTO H. BENNETT.
By Martin O. Smith
Attorney.

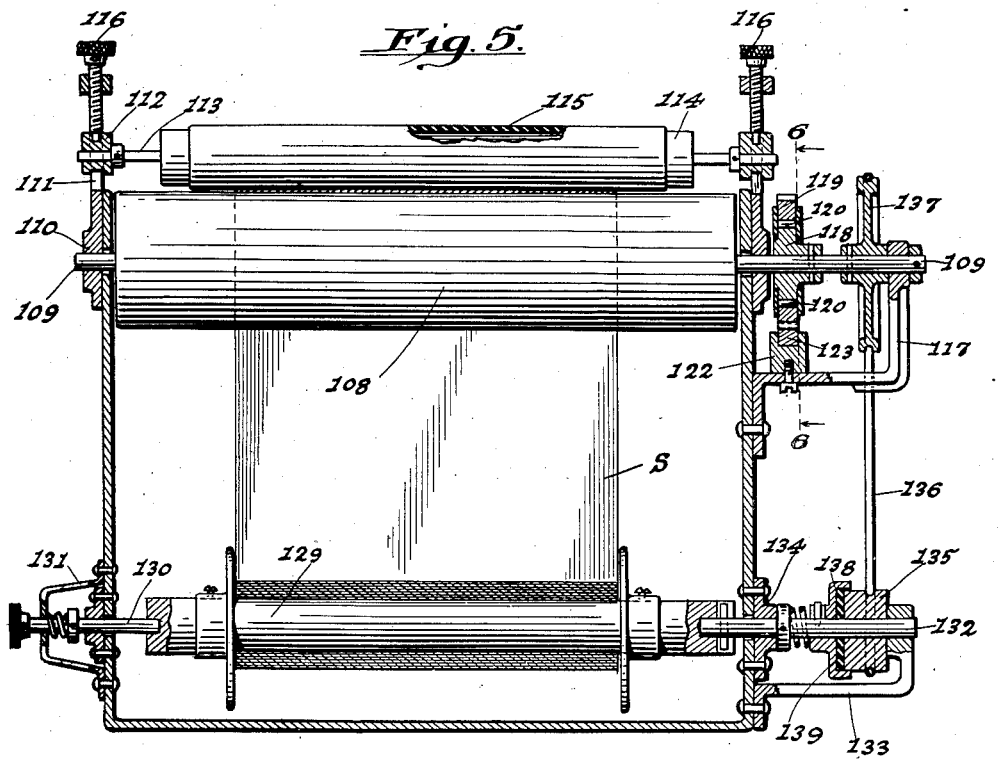
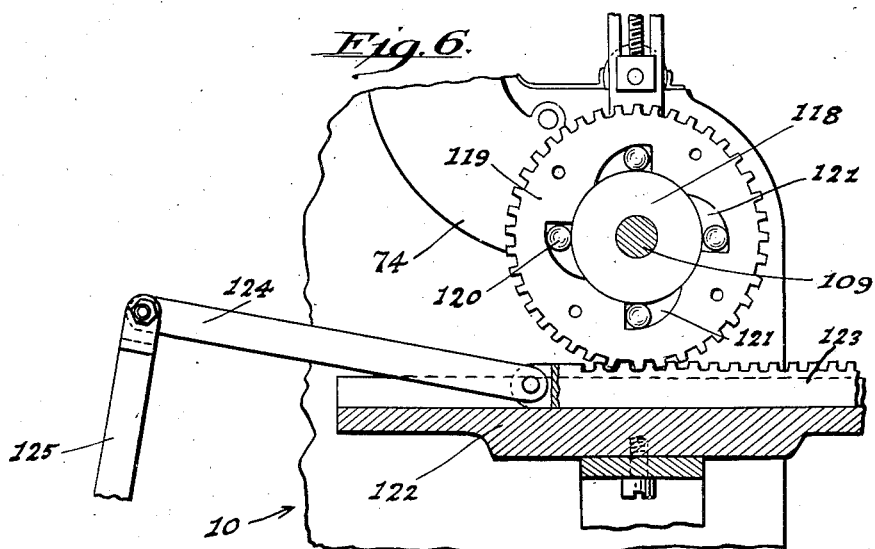

Sept. 15, 1936.     O. H. BENNETT     2,054,237
AUTOMATIC PHOTOROLL PRINTER
Filed Dec. 10, 1934     5 Sheets-Sheet 4
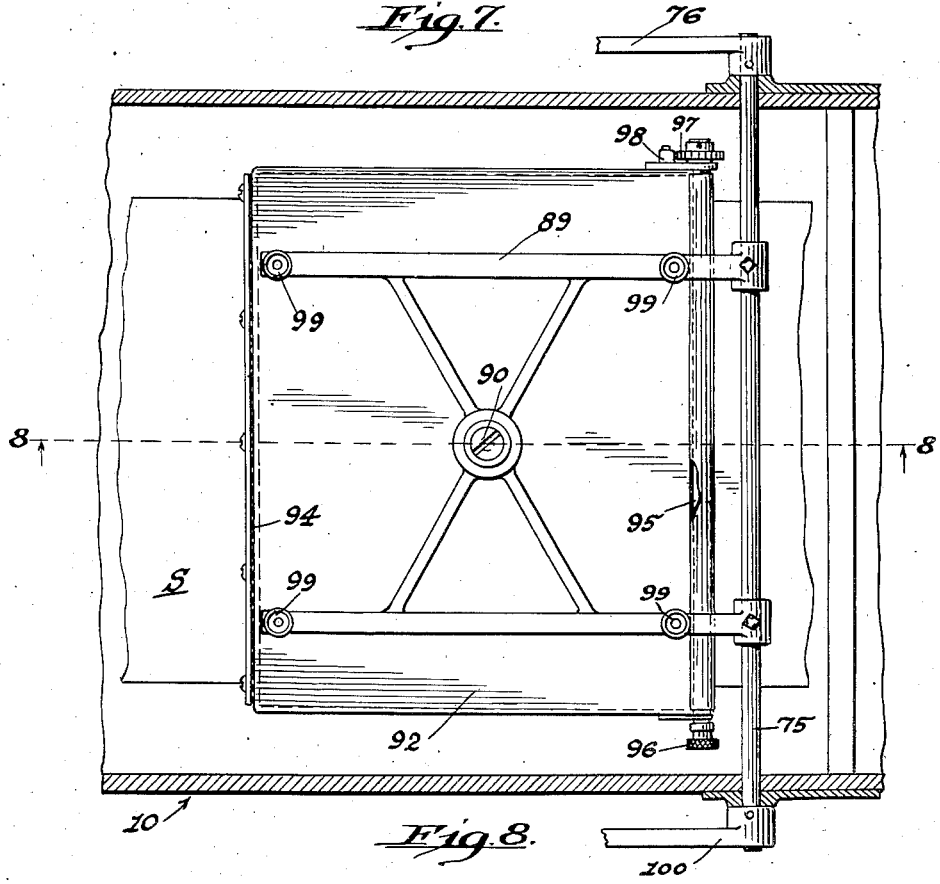
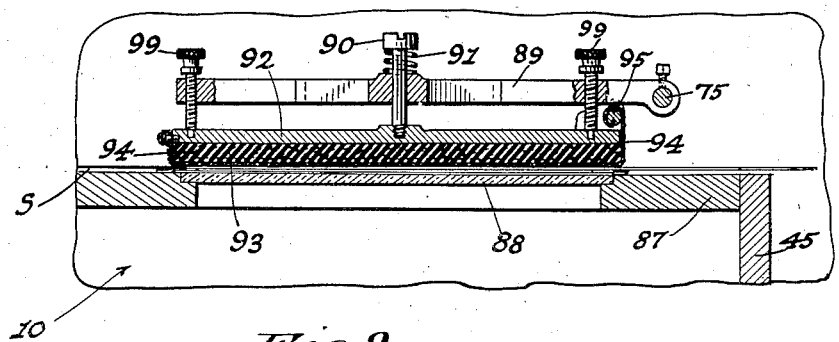
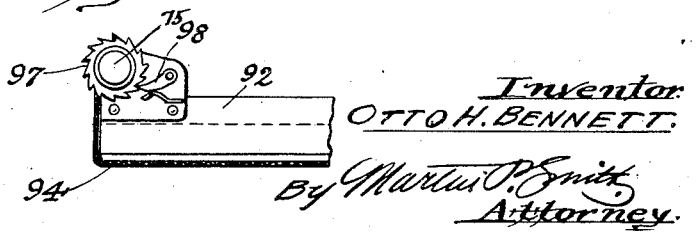
Inventor
OTTO H. BENNETT.
By Martin P. Smith
Attorney.

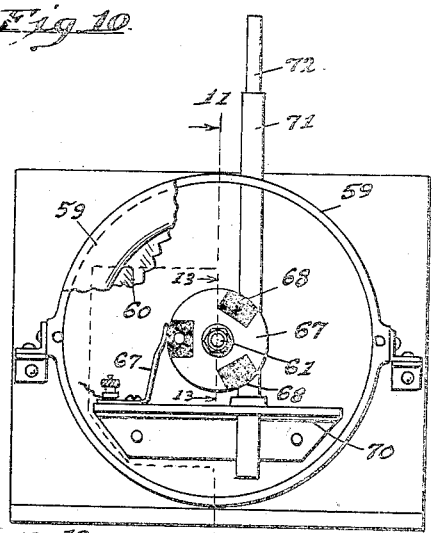
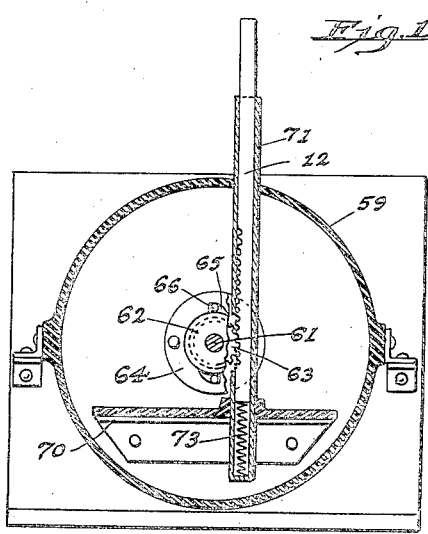
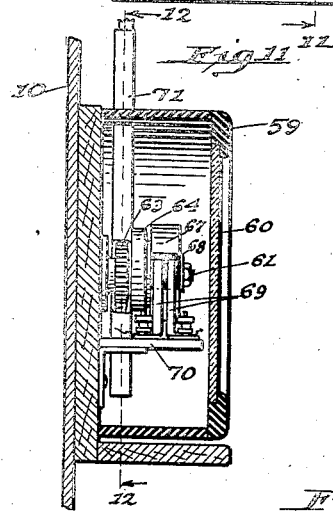
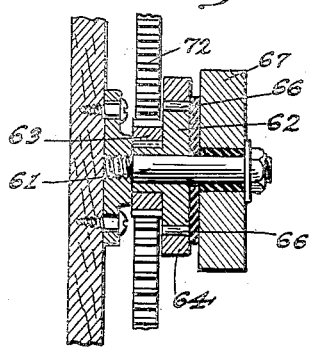
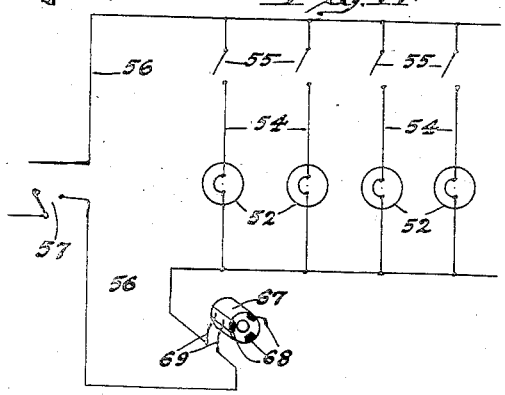

Patented Sept. 15, 1936

2,054,237

UNITED STATES PATENT OFFICE 2,054,237

AUTOMATIC PHOTOROLL PRINTER

Otto H. Bennett, Los Angeles, Calif.

Application December 10, 1934, Serial No. 756,854

13 Claims. (Cl. 95—75)

My invention relates to an automatic photo roll printer and has for its principal object, the provision of a relatively simple and practical machine for rapidly printing photographs from negatives onto a roll of sensitized paper, although the machine may be utilized for printing photographs on single sheets of paper that are successively placed in the machine above the negative.

A further object of my invention is, to provide a photo roll printer that is operated by an electric motor and which may be operated at a speed that will print from fifteen hundred to twenty-five hundred prints per hour on a roll or rolls of sensitized paper, thereby effecting a material saving of time and labor in the production of a large number of prints from the same negative.

Obviously if the transparent plate that serves as a support for the negatives is large enough to receive two or four negatives the sensitized roll printing operation may be very materially speeded up and the production costs correspondingly minimized.

Further objects of my invention are, to provide an automatic photo roll printer having a bank or plurality of electric lamps arranged beneath the transparent plate that supports the negative and said lamps being arranged to be adjusted vertically or toward and away from the negative supporting plate in order to regulate the intensity of the light utilized in producing the prints and to provide connections and switches for the individual lamps in the bank whereby any one or more of said lamps may be cut out in order to vary the density of the light at any predetermined spot or spots to correspond with the thin or heavy portions of the negative from which the prints are being made.

A further object of my invention is, to provide in a machine of the character referred to a platen that presses the roll of sensitized paper against the negative during the printing operation and which platen is adjustably mounted on its support so that when properly adjusted it will apply uniform pressure throughout the entire area of the sensitized paper that is positioned directly above the negative.

Further objects of my invention are, to provide an automatic photo roll printer, having simple and efficient means whereby the machine may be operated at different speeds, further, to provide relatively simple and adjustable means for unwinding the roll of sensitized paper from its carrying roll and for intermittently moving the web of paper through the machine above the supported negative and winding said paper onto its receiving roll and further, to provide an automatic switch that is actuated as the platen moves into engagement with that portion of the sensitized roll that is positioned above the negative for closing the circuit in which the bank of electric lamps is located, thereby lighting said lamps to effect the printing function.

A further object of my invention is, to provide an automatic photo roll printer wherein practically all of the essential operating parts of the machine are adjustable so as to accurately accomplish their respective functions and further, to enclose the negative support, the sensitized roll supporting rollers, the platen and the bank of electric lamps that furnish the light for the printing function, in a compact light-proof housing that occupies comparatively little floor space.

With the foregoing and other objects in view my invention consists in certain novel features of construction and arrangements of parts that will be hereinafter more fully described and claimed and illustrated in the accompanying drawings in which:

Fig. 3 is an elevational view looking in the direction indicated by the arrow 3 in Fig. 2 and showing the righthand side of the machine.

Fig. 4 is a vertical section taken on the line 4—4 of Fig. 2.

Fig. 5 is an enlarged vertical section taken on the line 5—5 of Fig. 3.

Fig. 6 is an enlarged detail section taken on the line 6—6 of Fig. 5.

Fig. 7 is an enlarged horizontal section taken approximately on the line 7—7 of Fig. 4 and showing the platen in the position it assumes when pressing the sensitized paper against the negative.

Fig. 8 is a vertical longitudinal section taken on the line 8—8 of Fig. 7.

Fig. 9 is an elevational view of a ratchet and pawl arrangement utilized for tightening the fabric that covers the cushioning member of the platen.

Fig. 10 is an elevational view of the rotary switch that controls the circuit in which the bank of electric lamps is located.

Fig. 11 is a vertical section taken on the line 11—11 of Fig. 10.

Fig. 12 is a vertical cross section taken approximately on the line 12—12 of Fig. 11.

Fig. 13 is an enlarged detail section taken on the line 13—13 of Fig. 10.

Fig. 14 is a diagrammatic view of the electric circuit in which the lamps are located and showing the rotary switch that controls said circuit and the individual switches for the lamps.

Figure 2:
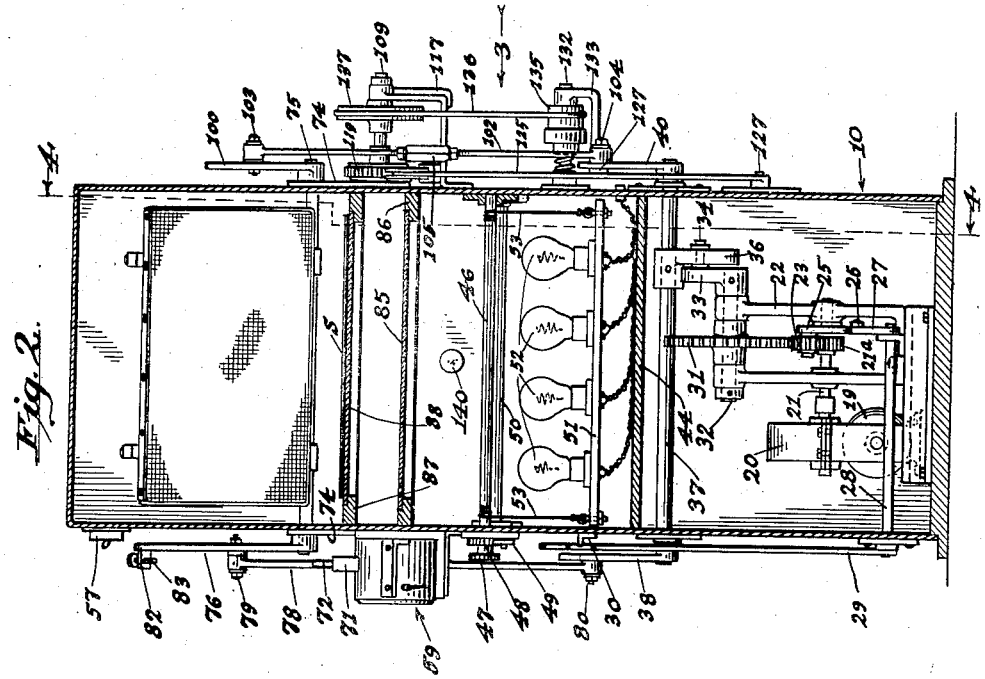
Fig. 2 is a vertical section taken on the line 2—2 of Fig. 1.

Referring by numerals to the accompanying drawings which illustrate a preferred embodiment of my invention, 10 designates a substantially rectangular upright housing, which may be formed of wood or metal, and closing an opening in the upper front portion of said housing is a panel 11, of transparent red material, preferably glass.

The chamber within the upper portion of the housing, to the rear of this panel, is occupied by the platen.

A portion of the housing, just below the panel 11, projects forwardly to form a chamber 12 that is occupied by the spool that carries the roll of sensitized paper and the wall 13 that normally closes this chamber is connected by hinge 14 to the front wall of the housing, in order that said wall 13 may be swung outwardly and downwardly to permit the ready insertion or removal of the sensitized roll carrying spool.

A portion of the rear wall of the housing is extended outward, as designated by 15, to form a chamber 16 that is occupied by the sensitized roll feeding rollers and the roller that receives the sensitized paper after it has been printed. A section 17 of red transparent material, preferably glass is located in the outer portion of the wall 15.

The housing 10 rests on a base 18 and mounted on said base is an electric motor 19. The shaft of this motor is connected through a conventional reduction gear that occupies a housing 20 to a horizontally disposed shaft 21, the latter being journaled in suitable bearings in an upstanding bracket 22.

Secured on shaft 21, is a pinion 22 that meshes with a pinion 23 and with a larger pinion 24 that are located on opposite sides of said pinion 22 and said pinions 23 and 24 being journaled on the ends of a bracket 25. This bracket is mounted to rock freely upon shaft 21 and one end of a link 26 is pivotally connected to the lower end of said bracket and the opposite end of said link is pivotally connected to a crank arm 27. This arm 27 is secured to the inner end of a horizontally disposed shaft 28, suitably journaled and one end of said shaft projecting through the lefthand wall of housing 10 and having connected thereto the lower end of an upwardly projecting hand lever 29.

The upper portion of lever 29 engages a ratchet plate 30 on the lefthand side wall of housing 10 for the purpose of holding said lever in different positions.

Pinion 23 and larger pinion 24 are adapted to mesh with a gear wheel 31 that is secured to a shaft 32 and the latter being journaled in bearings at the top of bracket 22.

Carried by one end of shaft 32 is a crank arm 33 and a wrist pin 34 projects from said crank arm through a slot 35 that is formed in an arm 36. One end of this arm is secured to a rock shaft 37 that has bearings in the side walls of housing 10.

The end of the shaft 37 that projects through the lefthand side wall of the housing carries an arm 38, having a longitudinally disposed slot 39 and the end of said shaft that projects through the righthand side wall of the housing carries a pair of arms 40 and 41 disposed approximately sixty degrees apart and said arms being provided respectively with longitudinally disposed slots 42 and 43.

Arranged within housing 10, above shaft 37, is a horizontally disposed partition 44, the rear end of which is secured to a vertically disposed wall 45 that is positioned immediately to the rear of the chamber 16.

Journaled in suitable bearings on the side walls of the housing above partition 44, adjacent the front wall of said housing, is a shaft 46, one end of which projects through the lefthand side wall of the housing and said projecting end carries a knob 47 and a ratchet wheel 48, the latter being engaged by the point of a spring pressed pawl 49.

By manipulation of the knob 47, the shaft may be rotated and the engagement of the pawl with the teeth of the ratchet wheel holds the shaft against reverse rotation.

Journaled in suitable bearings on the side walls of the housing in a plane just below that occupied by shaft 46 and adjacent the vertical wall 45, is a transversely disposed roller 50.

Arranged to move freely within the housing above the partition 44, is a panel 51 carrying a plurality of electric lamps 52 and connected to the four corners of this panel are the lower ends of flexible members 53 such as cores or cables and the two cores that extend upwardly from the rear corners of the panel pass over roller 50 and thence forwardly to roller 46. The cores that are connected to the forward corners of panel 51 pass directly upward to roller 46 and the ends of all of the cores are secured to said roller 46 so as to wind thereonto or therefrom as said roller is rotated.

The construction just described provides simple and efficient means for raising and lowering the panel 51 that carries the bank or series of electric lamps 52.

The conductors 54 that supply current to the lamps 52, lead from the underside of panel 51 through the righthand side wall of the housing and said conductors extend upwardly on said housing to individual switches 55 that are located on the upper front portion of the righthand side wall of the housing, as illustrated in Fig. 3. This arrangement enables any one or more of the lamps to be individually cut and thereby increase or decrease the volume of light issuing from any one or more points or areas within the light field produced by the bank of lamps 52.

Conductor 56 leads from the individual switches 55 to a switch 57 that is conveniently located on the side of the housing and which switch is connected to a suitable source of electric current supply (see Fig. 15).

Located on one side of the machine housing, preferably the left-hand side and insulated therefrom, is a small housing 59, having a transparent front wall 60.

Secured within this housing is a stud 61, on which is loosely mounted a disc 62, and carried by the hub of said disc is a pinion 63.

Surrounding disc 62, is a ring 64 having internally arranged pockets 65, in which are loosely mounted rollers 66 that bear on the periphery of disc 62, thus providing a rigid connection between said ring and disc, for the purpose of intermittently driving the ring in one direction.

Suitably secured to the ring 64 and insulated therefrom, is a disc 67 that rotates freely on stud 61 and seated in the periphery of said disc and spaced equal distances apart, are blocks 68 of insulating material.

The free ends of a pair of light contact springs 75

69 bear on the periphery of disc 67, said contact springs being supported on a bracket 70 and one of the conductors 56 is split and the ends thereof are electrically connected to said contact springs (see Fig. 14).

A tube 71 is arranged vertically within housing 59 to the side of stud 61, said tube projecting a short distance above the housing and arranged for reciprocatory movement in said tube, is a rack bar 72, the teeth of which engage the teeth of pinion 63.

Interposed between the lower end of rack bar 72 and the lower end of tube 71, is an expensive coil spring 73, that normally tends to elevate the rack bar.

Secured on the sides of the housing 10, at the upper end of the rearward extension 15, are brackets 74 and journaled in these brackets and extending transversely through the housing, is a shaft 75.

Secured on the left-hand end of this shaft is an arm 76 provided with a longitudinally disposed slot 77.

The upper end of a two-part connecting rod 78 is adjustably secured to arm 76, by a clamping bolt 79 that passes through slot 77 and the lower end of this rod is adjustably secured to arm 38 by clamping bolt 80 that passes through slot 39 in said last mentioned arm.

The adjacent ends of the two parts of rod 78 are connected by a turn-buckle or internally threaded tube 81.

The construction just described provides a wide range of adjustment for the motion that is transmitted from shaft 37 to shaft 75.

Projecting from the free end of arm 76 is a lug 82, through which passes a screw 83, said screw carrying a lock nut 84 and the end of this screw is adapted to engage the upper end of rack bar 72 and move same downward when arm 76 moves downward to its limit of movement and the downward movement of rack bar 72 imparts rotary motion to disc 67.

Arranged within the housing above shafts 46 and 50, is a frame 85 that surrounds a ground glass 86 and positioned just above this frame within the housing is a second frame 87 that surrounds a panel 88 of clear glass and which latter provides a support for the negative from which prints are made.

The upper face of frame 87 surrounding the glass 88 is very slightly recessed for the accommodation of the negative.

Secured to shaft 75, is the rear portion of a substantially rectangular skeleton frame 89 that supports the platen and extending through the center of this frame is a screw 90.

An expansive coil spring 91 is interposed between the center of the frame 89 and the head of this screw.

The lower end of screw 90 is seated in a plate 92, preferably of metal and arranged on the under side of this plate is a thick layer 93 of rubber.

Suitably secured to the front edge of plate 92, is the edge of a section of fabric 94 that extends beneath the layer of rubber 93 and the rear end of this fabric is secured to a shaft or roller 95 that is journaled in bearings at the rear corners of plate 92.

One end of shaft 95 carries a knob 96 and carried by the opposite end of said shaft is a ratchet wheel 97. This ratchet wheel is engaged by a pawl 98 that is pivotally mounted on the side of plate 92 and this arrangement provides means for maintaining the fabric 94 in taut condition on the platen.

Seated in the corners of frame 89, are vertically disposed screws 99, the lower ends of which are seated for rotation in plate 92.

Spring 91 tends to move the plate upwardly toward its supporting frame 89 and by manipulating the screws 99, the plate may be very accurately leveled so as to exert uniform downward pressure throughout its entire underface against the circulating sensitized sheet and negative.

Secured to the end of shaft 75 that projects through the bracket 74 on the right hand side of the housing, is an arm 100 that is practically identical with arm 76 and formed in said arm 100 is a longitudinally disposed slot 101.

The upper end of a two-piece connecting rod 102, which corresponds with the connecting rod 78, is adjustably clamped to arm 100 by a pawl 103 that passes through slot 101 and the lower end of this connecting rod is adjustably secured to arm 40 by a clamping bolt 104 that passes through slot 42. The adjacent ends of the two parts of the connecting rod are connected by a turn-buckle or an internally threaded tube 105.

Thus both ends of shaft 75 are connected to both ends of shaft 37 so as to impart uniform downward pressure to the platen through its supporting frame 89 that is carried by said shaft 75.

A spool 106 carrying a roll of sensitized paper, occupies chamber 12 with the ends of said spool supported in suitable bearings in the side walls and from said spool the sensitized paper designated by S, passes between a pair of guiding rollers 107 that are positioned directly in front of frame 87 and said paper then passes across the frame and the glass panel that supports the negative.

Arranged within the upper portion of chamber 16, is a sensitized paper feeding roller 108 and projecting from the ends thereof, are short shafts 109 that are journaled in bearings 110 on the sides of the housing.

The upper portions of these bearings 110 are provided with vertically disposed slots 111, in which are mounted for sliding movement bearings 112 that receive short shafts 113 that project from the ends of a pressure roller 114. The periphery of this pressure roller is covered with a layer 115 of flexible or elastic material such as rubber and this roller exerts pressure on the sheet of sensitized paper that passes between said pressure roller and the feed roller 108.

The bearings 112 are adjusted downward by means of screws 116 that are seated in the upper portions of the bearings 110 (see Fig. 5).

The shaft 109 that projects from the right hand end of feed roller 108 is journaled in a bearing on a bracket 117 and secured to said projecting shaft, is a disc 118.

Surrounding said disc and held for independent rotation thereupon, is a gear wheel 119.

A ratchet arrangement is provided by the disc 118 and the surrounding gear wheel 119 by balls or rollers 120 that are arranged in tapered pockets 121 formed in the gear wheel and which balls or rollers bear on the periphery of disc 118 (see Fig. 6).

This arrangement enables the gear wheel when rotated in one direction to impart rotary movement to disc 118 and the feed roller and when the gear wheel is rotated in the opposite direction the disc and said roller are idle.

Supported by bracket 117, beneath the gear wheel, is a grooved rail 122, in which is arranged for sliding movement a rack bar 123, the teeth of which engage gear wheel 119.

Pivotally connected to the inner end of rack bar 123, is one end of a link 124 and pivotally connected to the opposite end of said link is the upper end of a swinging arm 125, the lower end of which is journaled on a stud 126 that projects from the righthand side of the housing 10.

Pivotally connected to the intermediate portion of arm 125, is one end of a link 127, the opposite end of which is adjustably secured to arm 41 by a bolt 128 that passes through the slot 43 in said arm 41.

Positioned in the lower portion of chamber 16, is a spool 129 that receives the sensitized paper after the same has been printed and after said paper has passed between feed roller 108 and pressure roller 114.

The lefthand end of this spool is engaged by a spring pressed pin 130 that is mounted for sliding movement in a bracket 131 on the lefthand side wall of the housing.

The opposite end of spool 129 is detachably mounted on a shaft 132 that is mounted for rotation in bearings 133 and 134 on the righthand side of the housing and loosely mounted on said shaft is a pulley 135. This pulley receives a belt 136 that passes over a pulley 137 that is secured on shaft 109.

Mounted for sliding movement on shaft 132, is a spring pressed disc 138 carrying on its face a disc 139 of rubber or fiber and which has frictional engagement with the adjacent face of pulley 135.

The construction just described provides a friction producing connection between pulley 135 and disc 138, which latter rotates with the shaft 132 that carries the spool 129 and as a result the web of sensitized paper is always maintained in a taut condition as it passes from the spool 106 to the receiving spool 129.

Located on the upright partition 45, just below frame 85, is a ruby lamp 140 and the electric connections to this lamp lead to a socket 141 that is located on the side of the housing adjacent the switch 58.

Located adjacent socket 141 is a socket 142 for the reception of a plug that carries the supply lines for the current used in lighting the lamps 52 and electrical connections (not shown) lead from the motor to a socket 143 located adjacent socket 142.

The operation of my improved photo roll printer is as follows:

As motor 20 is operated, the rotary motion of its shaft is transmitted through pinion 22 and either pinion 23 or 24 to gear wheel 31, thereby rotating shaft 32 and the engagement of wrist pin 34 in slot 35 of arm 36 imparts rocking movement to shaft 37.

The pinions 23 and 24 are of different diameters and they are utilized for imparting different speeds to gear wheel 31.

Hand lever 29 is utilized for rocking the frame or bracket 25 to move one or the other of the pinions 23 and 24 into engagement with gear wheel 31.

It will be understood that a negative or negatives are positioned on glass panel 88 and secured by clips or stickers and that the web of sensitized paper passes from spool 106 across the negative supporting panel, thence between rolls 108 and 114 and thence downwardly onto the receiving spool 129.

Under normal conditions the contact springs 69 rest on one of the blocks of insulation so that no current is flowing through the bank of lamps 52.

Figure 1:
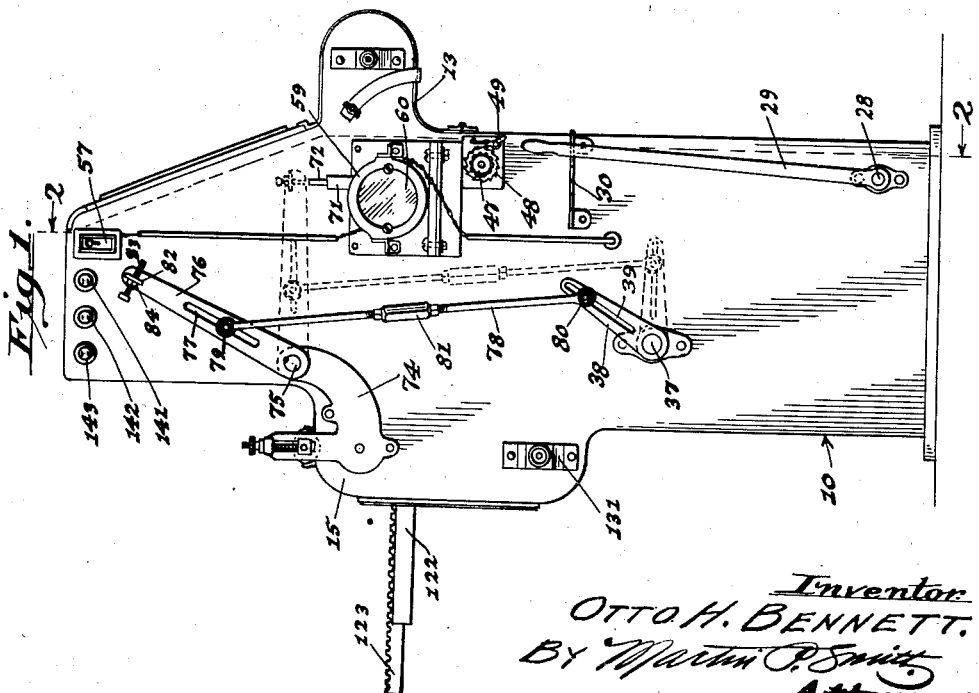
Fig. 1 is an elevational view of my improved automatic photo roll printer and looking against the lefthand side thereof.

As shaft 37 is rocked, arms 38 and 40 will swing from their normal positions as illustrated by solid lines in Figs. 1 and 3 downwardly into the position shown by dotted lines in said figures, thereby simultaneously pulling connecting rods 78 and 102 downward and imparting corresponding downward swinging movement to arms 76 and 100, thereby rocking shaft 75. This shaft carries the platen, which latter when elevated occupies the position shown by solid lines in Fig. 4 and when moved downward, it assumes the position shown by dotted lines in Fig. 4 with the cushion on the under side of the platen resting directly on top of that portion of the sensitized paper that overlies the negative or negatives positioned on transparent panel 88.

After the cushion or compressible pad 93 of the platen engages the sensitized paper, further rocking movement of shaft 75 causes the cushion to be compressed so as to very tightly press the sensitized paper against the negative and as this final movement takes place the screw 83 carried by the free end of arm 76 engages the upper end of plunger 72 and moves same downward, thereby imparting rotary movement to pinion 63.

Disc 62, which is carried by pinion 63 will, through the ratchet connections 65 and 66 impart corresponding rotary motion to disc 67 carrying the plugs 68 of insulation and said disc will be partially rotated so that the ends of contact springs will ride over that portion of the periphery of the disc between a pair of the plugs of insulation, thereby closing the electric circuit in which the bank of lamps 52 is located, with the result that all of said lamps will be lighted.

The light from the lamps pass upwardly through ground glass 86, thence through the transparent panel 88 and thence through the negative to effect the printing on the overlying portion of the sensitized sheet.

Shaft 46 may be operated by manual manipulation of knob 47 to raise or lower the panel 51 carrying the bank of lamps so as to position said lamps closer to or further away from the negative and thus controlling the volume or intensity of the light utilized in effecting the printing operations.

If a portion of the negative is "thin" the lamp or lamps immediately below such "thin" portion may be cut out by manipulation of the corresponding switches 55 so that prints of uniform density may be obtained even though the negative is "thin" in some portion or portions.

At the lower end of the travel of plunger 72, the disc 67 will have been rotated so as to bring one of the blocks of insulation 68 into engagement with the ends of contact spring 67, thus opening the circuit to the bank of lamps and thus all of the lamps in the bank are cut out.

Simultaneous with the movements just described and which effect downward movement of the platen, arm 41 carried by shaft 37 will be swung forwardly to the position shown by dotted lines in Fig. 3 and through link 127 arm 125 will be swung on its axis 126 to the position shown by dotted lines in Fig. 3 and through link 124 rack bar 123 will be drawn forwardly through grooved rail 122.

The engagement of the teeth of rack bar 123 with ring gear 119 will, through the ratchet connections with disc 118, impart rotary motion to said disc and such rotary motion will be imparted to feed roller 108 upon which said disc is mounted.

Thus the feed roller will be rotated and the pressure roll 114 cooperating therewith will draw the sensitized sheet from the spool 106 across the negative supported panel and the sensitized sheet passes downward from feed roller 108 to spool 129.

This sensitized sheet receiving spool is driven from the feed roll by means of band 136 that operates on pulleys 135 and 137.

Thus the sensitized sheet is intermittently fed across the negative supporting panel and such feeding movement takes place as the platen is swinging downward and the feeding movement of the sensitized sheet is stopped when the cushion on the under side of the platen exerts sufficient pressure on the sensitized sheet and during the final downward movement of the platen the cushion is compressed to exert pressure on that portion of the sensitized sheet that overlies the negative and at this time the screw 83 engages and moves plunger 12 downward to close the circuit to the bank of lamps as hereinbefore described.

As shaft 37 is reversely rocked the various operating parts will return to their normal positions as illustrated in Figs. 1 to 4 inclusive.

During this reverse movement, the platen will be swung upward and the rack bar 123 will move to its rear limit of movement and during such operation the ratchet connections between the ring gear 119 and disc 118 will permit the ring gear to be reversely rotated without imparting such movement to disc 118 that is carried at one end of the feeding roll 108.

Among the specially desirable features of my invention are, the means operated from an electric motor for automatically actuating in proper sequence the various parts and elements that effect the printing operation, further, the convenient means whereby practically all operating parts of the machine are capable of being easily and quickly adjusted so as to produce perfect results, also the control of the source of light utilized in effecting printing operations and the provision of a photo roll printer that is very compact and which will very rapidly and efficiently perform the printing operations.

The plate 92 that bears the platen cushion 94 may be very accurately leveled due to the provision of the adjusting screws 99 and the shaft 95 provides simple and efficient means for drawing the fabric covering of the cushion into smooth and taut condition on the undersurface of the cushion.

The screw 83 is readily adjustable so as to regulate the length of time of exposure of the negative or in other words the length of time that the lamps in the bank are lighted and the nut 84 located on said screw provides means for locking said screw after its adjustment.

It will be understood that minor changes in the size, form and construction of the various parts of my improved photo roll printer may be made and substituted for those herein shown and described without departing from the spirit of my invention, the scope of which is set forth in the appended claims.

I claim as my invention:

1. In a photo roll printer, a housing, a transparent negative supporting panel within said housing, means for intermittently moving a strip of sensitized paper across said panel, a platen arranged for swinging movement in the housing and adapted when swung downward to press a portion of the sensitized sheet against a negative supported by said panel, a support arranged for vertical movement below said panel, a series of electric lamps carried by said support, manually operable means for elevating said support and lamps, means for securing said support in differently adjusted positions, an electrical circuit having separate connections to the individual lamps, a switch in each separate connection, a rotary switch in said electric circuit, a plunger for actuating said switch and adjustable means carried by said platen for engaging and moving said plunger to actuate said switch when said platen moves into engagement with said sensitized strip.

2. In a photo roll printer, a housing, a transparent negative supporting panel arranged within said housing, a platen mounted for swinging movement above said panel, a rock shaft journaled in the housing, adjustable operating connections between said rock shaft and platen, motor driven means for intermittently actuating said operating means to swing the platen downward onto the panel, a web of sensitized paper mounted in the housing for movement across said panel and motor actuated means including a feed roller, a rack bar, a gear wheel and a clutch disposed between said pinion and feed roller for imparting movement to said web of paper as the platen moves downwardly toward said panel.

3. In a photo roll printer, a housing, a transparent negative supporting panel arranged within said housing, a frame mounted for swinging movement above said panel, a platen adjustably mounted on said frame, a rock shaft journaled in the housing, motor driven means for intermittently rocking said shaft, adjustable connections between said rock shaft and said platen carrying frame, a web of sensitized paper mounted in the housing for movement across said panel, means for imparting movement to said web of paper as the platen moves downwardly toward said panel, a support arranged for vertical movement within the housing below said panel, a series of electric lamps carried by said frame, an electric circuit in which said lamps are located, a switch in said circuit, a plunger for actuating said switch and adjustable means carried by the platen operating means for engaging said plunger to actuate said switch and close said circuit as said platen is moved into engagement with that portion of the sensitized paper that overlies said panel.

4. In a photo roll printer, a housing, a transparent negative supporting panel arranged within said housing, a frame mounted for swinging movement above said panel, a platen adjustably mounted on said frame, a rock shaft journaled in the housing, motor driven means for intermittently rocking said shaft, adjustable connections between said rock shaft and said platen carrying frame, a web of sensitized paper mounted in the housing for movement across said panel, means for imparting movement to said web of paper as the platen moves downwardly toward said panel, a support arranged for vertical movement within the housing below said panel, a series of electric lamps carried by said frame, an electric circuit in which said lamps are located, a switch in said circuit, a plunger for actuating said switch, adjustable means carried by the platen operating means for engaging said plunger to actuate said switch and close said circuit as said platen moves into engagement with that portion of the sensitized paper that overlies said panel manually operable means for raising said lamp carrying support and means for securing said support in differently adjusted positions.

5. In a photo roll printer, a housing, a transparent negative supporting panel arranged within said housing, spools arranged on opposite sides of said panel for supporting a strip of sensitized paper, a shaft journaled at one end of said panel between said spools, a feeding roller carried by said shaft, a gear wheel, a clutch between said shaft and gear wheel, a rack engaging said gear wheel, a pressure roller adjacent to said feeding roller, a platen arranged for swinging movement above said panel and motor driven means for simultaneously swinging said platen downwardly onto said panel and for imparting rotary movement to said rack.

6. In a photo roll printer, a housing, a transparent negative supporting panel arranged within said housing, spools arranged on opposite sides of said panel for supporting a strip of sensitized paper, a shaft journaled at one end of said panel between said spools, a feeding roller carried by said shaft, a gear wheel, a clutch between said shaft and gear wheel, a rack engaging said gear wheel, a pressure roller adjacent to said feeding roller, a platen arranged for swinging movement above said panel, motor driven means for simultanously swinging said platen downwardly onto said panel and for imparting rotary movement to said rack, a series of lamps arranged within the housing below said panel, an electric circuit in which said lamps are located, a switch in said circuit and adjustable means carried by the platen operating means for closing said switch.

7. In a photo roll printer, a housing, a transparent negative supporting panel arranged within said housing, spools arranged on opposite sides of said panel for supporting a strip of sensitized paper, a shaft journaled at one end of said panel between said spools, a feeding roller carried by said shaft, a gear wheel, a clutch between said shaft and gear wheel, a rack engaging said gear wheel, a pressure roller adjacent to said feeding roller, a platen arranged for swinging movement above said panel, motor driven means for simultaneously swinging said platen downwardly onto said panel and for imparting rotary movement to said rack, a series of lamps arranged within the housing below said panel, an electric circuit in which said lamps are located, a switch in said circuit, adjustable means carried by the platen operating means for actuating said switch, manually operable means for simultaneously raising said lamps and means for securing said lamps in differently adjusted positions.

8. In a photo roll printer, the combination with a transparent negative supporting panel and means for intermittently moving a sensitized strip across said panel, of a frame arranged for swinging movement above said panel, a platen arranged beneath the frame, a bolt passing through the center of said frame and secured to the center of said platen, a spring arranged between said frame and the head of said bolt and adjusting screws seated in the corners of the frame and bearing on the corners of the platen.

9. In a photo roll printer, the combination with a transparent negative supporting panel and means for intermittently moving a sensitized strip across said panel, of a frame arranged for swinging movement above said panel, a platen arranged beneath said frame, which platen comprises a plate and a layer of compressible material underlying said plate, a bolt passing through the center of said frame and secured to the center of the platen, a spring arranged between said frame and the head of said bolt and adjusting screws seated in the corners of the frame and bearing on the corners of the platen.

10. In a photo roll printer, the combination with a transparent negative supporting panel and means for intermittently moving a sensitized strip across said panel, of a frame arranged for swinging movement above said panel, a platen arranged beneath said frame, which platen comprises a plate, a layer of compressible material underlying said plate and a layer of fabric covering the face of said layer of compressible material, a bolt passing through the center of said frame and secured to the center of the platen, a spring arranged between said frame and the head of said bolt and adjusting screws seated in the corners of the frame and bearing on the corners of the platen.

11. In a photo roll printer, the combination with a transparent negative supporting panel and means for intermittently moving a sensitized strip across said panel, of a frame arranged for swinging movement above said panel, a platen arranged beneath said frame, which platen comprises a plate, a layer of compressible material underlying said plate, a layer of fabric covering the face of said layer of compressible material, adjustable means for imparting tension to said layer of fabric, a bolt passing through the center of said frame and secured to the center of the platen, a spring arranged between said frame and the head of said bolt and adjusting screws seated in the corners of the frame and bearing on the corners of the platen.

12. In a photo roll printer, a housing, a transparent negative supporting panel arranged within said housing, a platen mounted for swinging movement above said panel, a rock shaft journaled in the housing, means for rocking said shaft, a motor manually operable means for imparting differential rotary movement from the shaft of said motor to said rock shaft operating means, an arm carried by said rock shaft, an arm secured to the axis of a platen and adjustable means connecting said arms.

13. In a photo roll printer, a housing, a transparent negative supporting panel arranged within said housing, a platen mounted for swinging movement above said panel, a rock shaft journaled in the housing, means for rocking said shaft, a motor manually operable means for imparting differential rotary movement from the shaft of said motor to said rock shaft operating means, an arm carried by said rock shaft, an arm secured to the axis of a platen, adjustable means connecting said arms, sensitized strip carrying rollers mounted on opposite sides of said transparent panel, a feed roller arranged between said strip carrying rollers and adjustable means arranged between said rock shaft and said strip feeding rollers for imparting intermittent rotary motion thereto.

OTTO H. BENNETT.